(12) United States Patent
Boehm et al.

(10) Patent No.: US 11,351,885 B2
(45) Date of Patent: Jun. 7, 2022

(54) CHARGING INFRASTRUCTURE UNIT, AND CHARGING INFRASTRUCTURE HAVING A CHARGING POWER OPTION

(71) Applicant: Siemens Aktiengesellschaft, Munich (DE)

(72) Inventors: Markus Boehm, Moehrendorf (DE); Gerald Buerger, Heroldsberg (DE); Martin Kaltenbach, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 17/049,087

(22) PCT Filed: Apr. 10, 2019

(86) PCT No.: PCT/EP2019/059014
§ 371 (c)(1),
(2) Date: Oct. 20, 2020

(87) PCT Pub. No.: WO2019/201688
PCT Pub. Date: Oct. 24, 2019

(65) Prior Publication Data
US 2021/0237611 A1 Aug. 5, 2021

(30) Foreign Application Priority Data
Apr. 20, 2018 (DE) ............... 10 2018 206 168.8

(51) Int. Cl.
*H02J 7/00* (2006.01)
*H02J 7/14* (2006.01)
*B60L 53/67* (2019.01)
*B60L 53/31* (2019.01)
*H02J 7/04* (2006.01)

(52) U.S. Cl.
CPC ............... *B60L 53/67* (2019.02); *B60L 53/31* (2019.02); *H02J 7/0013* (2013.01); *H02J 7/00032* (2020.01); *H02J 7/0045* (2013.01); *H02J 7/04* (2013.01); *H02J 2207/20* (2020.01)

(58) Field of Classification Search
USPC ........................................................ 320/104
See application file for complete search history.

(56) References Cited

U.S. PATENT DOCUMENTS 10,457,153 B2 * 10/2019 Wischnack ........... H02J 7/0027
2010/0106631 A1 4/2010 Kurayama et al.
(Continued)

FOREIGN PATENT DOCUMENTS

| DE | 102013200949 A1 | 7/2014 |
| DE | 102016103011 A1 | 8/2017 |
| EP | 2572431 A2 | 3/2013 |

*Primary Examiner* — Alexis B Pacheco
(74) *Attorney, Agent, or Firm* — Laurence A. Greenberg; Werner H. Stemer; Ralph E. Locher

(57) ABSTRACT

A charging infrastructure unit for at least partly electrically driven vehicles has one or more DC supply devices for charging one or more vehicles, one or more supply connections, and one or more charging connections. At least one of the one or more DC supply devices can be supplied with energy via one or more supply connections, and a respective vehicle can be connected to a charging connection. There is also described a charging infrastructure with such charging units.

20 Claims, 8 Drawing Sheets

(56) References Cited

U.S. PATENT DOCUMENTS

| | | | |
|---|---|---|---|
| 2011/0101915 A1* | 5/2011 | Mitsutani | B60L 53/305 320/109 |
| 2012/0119683 A1* | 5/2012 | Matsuyama | H02J 1/10 318/51 |
| 2013/0106365 A1* | 5/2013 | Ang | H02J 7/02 320/138 |
| 2013/0187602 A1 | 7/2013 | Bouman | |
| 2013/0257375 A1* | 10/2013 | Ang | B60L 53/14 320/109 |
| 2016/0121749 A1* | 5/2016 | Mensah-Brown | B60L 58/20 307/10.1 |
| 2017/0240063 A1* | 8/2017 | Herke | H02J 3/14 |
| 2018/0212438 A1* | 7/2018 | Bouman | B60L 53/63 |
| 2021/0061113 A1* | 3/2021 | Ellis | H02J 7/342 |

* cited by examiner

CHARGING INFRASTRUCTURE UNIT, AND CHARGING INFRASTRUCTURE HAVING A CHARGING POWER OPTION

BACKGROUND OF THE INVENTION

Field of the Invention

The invention relates to a charging infrastructure and to a charging infrastructure unit for at least partially electrically operated vehicles. At least partially electrically operated vehicles may be, in particular, electric vehicles and/or hybrid vehicles. Vehicles are, in particular, automobiles, vans, pick-up trucks, forklift trucks, buses, autonomously driving transport or service vehicles and/or trucks.

Charging infrastructure units which are directly connected to a power supply system via an AC/DC converter are known from the prior art. They generally provide charging connections for one or more vehicles. The powers provided at these charging connections of a charging infrastructure unit can also be redirected in some cases to one charging connection, with the result that one charging connection on the charging infrastructure unit can be additionally operated with the power from other charging connections of the same charging infrastructure unit. Furthermore, vehicles at the charging infrastructure units in a charging infrastructure must be DC-isolated from the network. For this purpose, upstream LF transformers can be provided at the network connection point with subsequent AC/DC conversion. The LF transformer must then have its own secondary winding for each charging point, which results in high costs and an inflexible design with respect to the expandability of the system.

Alternatively, the DC-isolation can also be effected in a DC controller with an HF transformer, rather than at the network connection point. A plurality of secondary windings and individually controllable voltage and/or current controllers are then on the secondary side of the transformer, which likewise results in high costs and an inflexible design with respect to the expandability of the system. In addition, infrastructures constructed in this manner are highly limited with respect to the provision of the charging power at the individual charging connections.

SUMMARY OF THE INVENTION

The object of the invention is therefore to provide a charging infrastructure unit and a charging infrastructure which eliminate the disadvantages from the prior art.

The object is achieved by means of independent claim(s) and the claims dependent thereon.

An exemplary embodiment relates to a charging infrastructure unit for at least partially electrically operated vehicles, having one or more DC chopper controllers for charging one or more vehicles, having one or more supply connections and having one or more charging connections, wherein at least one of the one or more DC chopper controllers can be supplied with energy via one or more supply connections and a vehicle can be respectively connected to a charging connection, wherein
each charging connection is connected to a first type of a DC-isolated DC chopper controller, which is electrically connected to one or more supply connections, and a first charging power is provided at the respective charging connection via the first type of the one DC-isolated DC chopper controller;
one or more second types of a DC-isolated DC chopper controller are arranged such that they can be connected in parallel with the first type of DC-isolated DC chopper controller via one or more switches in such a manner that the DC-isolated DC chopper controller of the second type forms a boost unit for the DC-isolated DC chopper controller of the first type, with the result that a second charging power of the second type(s) of DC-isolated DC chopper controller can be provided, in addition to the first charging power of the first type of DC-isolated DC chopper controller, at a respectively assigned charging connection, wherein the boost unit is permanently assigned to the charging connection(s) and/or the boost unit can be variably assigned to the charging connection(s).

It is preferred that the charging infrastructure unit also has a communication unit and a control unit.

It is also preferred that the charging connections of an infrastructure unit can be operated either all in parallel or all in series or that some of the charging connections can be operated in parallel and some of the charging connections can be operated in series. The term "can be operated in parallel" here means that the charging power is simultaneously available at the charging connections and the term "in series" means that the charging power is respectively available only at one charging connection.

It is also preferred that each boost unit can be respectively connected in parallel with a first type of a DC-isolated DC chopper controller via a mechanical circuit breaker or a semiconductor circuit breaker.

It is also preferred that the switch is a mechanical circuit breaker, in particular a contactor, or a semiconductor switch which is underdimensioned with respect to fault currents and is designed, in particular, to connect the boost unit in parallel with the DC-isolated DC chopper controller of the first type or to disconnect it therefrom without power before or after a charging operation.

It is also preferred that the charging infrastructure unit has two or more DC-isolated DC chopper controllers of the first type and one or more DC-isolated DC chopper controllers of the second type.

It is also preferred that the charging infrastructure unit has one DC-isolated DC chopper controller of the first type and one or more DC-isolated DC chopper controllers of the second type as a boost unit for charging a vehicle battery in a faster and/or more efficient manner.

It is also preferred that a charging infrastructure is formed by or contains two or more charging infrastructure units according to one of the embodiments above which are arranged electrically in series.

It is also preferred that the charging infrastructure has one or more central control units and one or more central communication units, wherein the communication unit is designed to receive or retrieve usage data from the charging infrastructure units connected in the charging infrastructure and to transmit control signals to the charging infrastructure units connected in the charging infrastructure, and the control unit is designed to capture current profiles and voltage profiles into the charging infrastructure and inside the charging infrastructure and to evaluate the usage data and the captured current profiles and voltage profiles and to generate control signals for the charging infrastructure units on the basis of such an evaluation and to transmit them via the communication unit. This produces optimum efficiency and/or optimized charging times.

It is also preferred that the charging infrastructure is connected to an LV AC network and/or an MV AC network and/or an HV AC network via one or more AC/DC converters and is supplied with electrical energy.

It is also preferred that the charging infrastructure additionally has one or more battery stores which are configured to temporarily or permanently supply the charging infrastructure units connected in the charging infrastructure with energy.

It is also preferred that the one or more battery stores are at least partially constructed with battery storage units comprising used battery storage units, in particular used vehicle battery storage units.

It is also preferred that the one or more battery stores are configured to provide network services such as peak shaving or frequency stabilization, wherein the network services should be provided automatically on the basis of current profiles and voltage profiles into the charging infrastructure or in response to a control command received from the infrastructure or from outside the charging infrastructure via the central communication unit.

It is also preferred that the charging infrastructure also has one or more regenerative energy generation units which feed electrical power into the one or more battery stores or into a network inside the charging infrastructure.

It is also preferred that the charging infrastructure is configured to provide network services such as peak shaving or frequency stabilization from energy stores of the connected vehicles, wherein the network services should be provided automatically on the basis of current profiles and voltage profiles into the charging infrastructure or in response to a control command received from the infrastructure or from outside the charging infrastructure via the central communication unit.

It is also preferred that the charging infrastructure has one or more central booster units which can be connected in parallel with charging infrastructure units and/or with one or more DC-isolated DC chopper controllers of the first type by means of one or more mechanical circuit breakers or semiconductor circuit breakers.

It is also preferred that the energy distribution inside the charging infrastructure, in particular between the charging infrastructure units and from battery stores to charging infrastructure units, is electrically interconnected by means of busbar systems, in particular by means of busbars arranged underground or above vehicles, and/or at least some of the charging infrastructure units can be connected to one another in a crosswise manner via busbar systems.

It is also preferred that the busbars are arranged under a roof and the charging infrastructure units are in the form of a weight-bearing construction and support the roof and the busbars.

It is also preferred that the busbars are encapsulated or enclosed busbars, with the result that the busbars can be laid and used outdoors.

It is also preferred that at least the charging infrastructure units and one or more AC/DC converters are constructed in such a manner that they are arranged in a displaceable manner on a transport vehicle.

In particular, it is preferred that the busbars also have a modular structure and/or the battery stores are constructed so as to be able to be transported in a truck.

It is also preferred that the charging of the vehicles is optimized on the basis of a SOC of the battery stores of the vehicles which is transmitted from the vehicles, specifically via the central control unit and/or the control units in the infrastructure units.

It is also preferred that the boost units can be connected via the individual charging infrastructure units and/or the central control unit.

It is also preferred that the infrastructure units have a human machine interface which can be used to control and/or select charging operations, in particular to also set charging times or planned departure times.

The invention is explained, by way of example, below on the basis of figures.

DETAILED DESCRIPTION OF THE INVENTION

Figure 1:
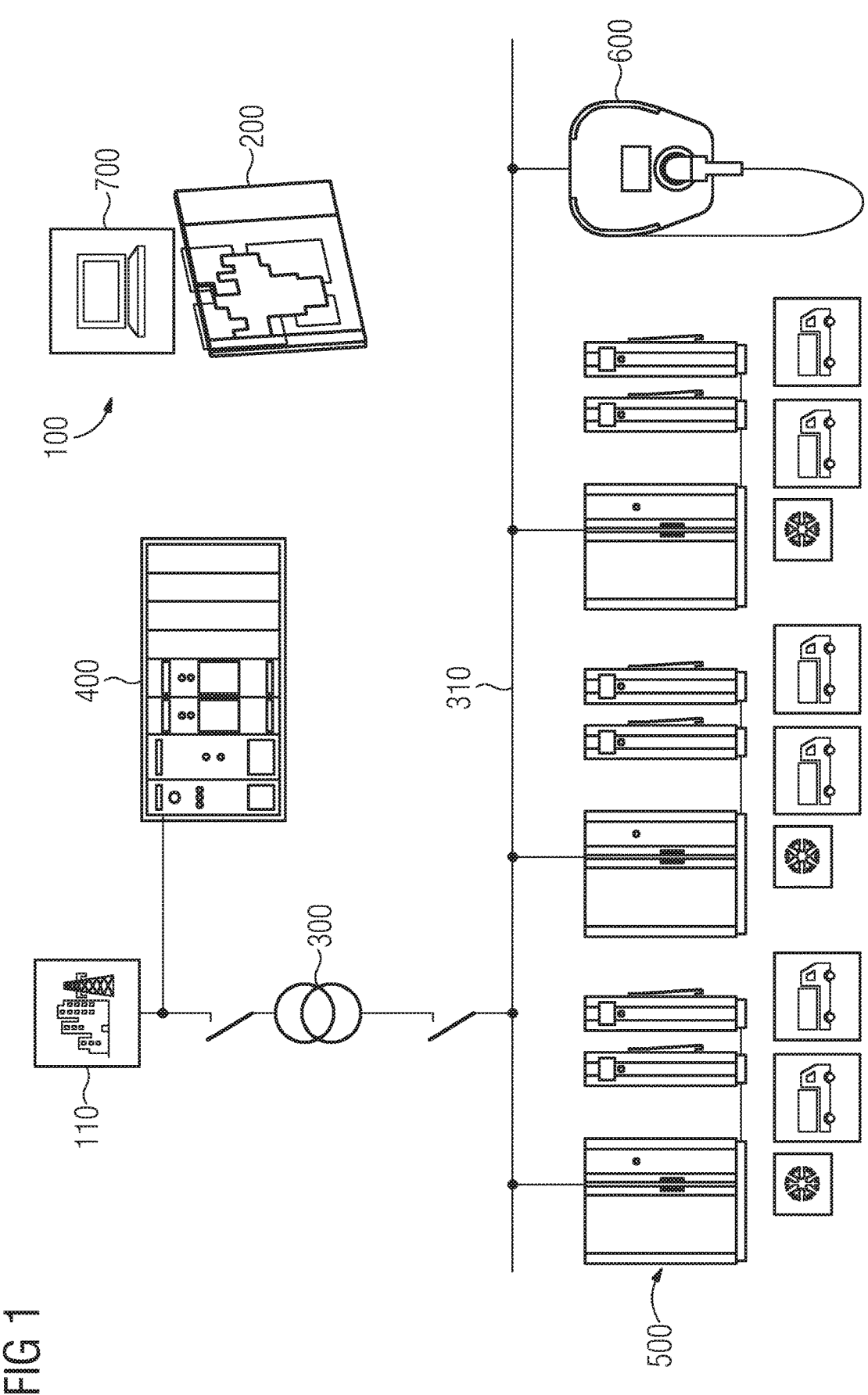
FIG. 1: schematic illustration of a charging infrastructure from the prior art.

FIG. 1 shows a schematic illustration of a charging infrastructure from the prior art, wherein a charging infrastructure is supplied with energy from a medium-voltage network 110, in particular an AC medium-voltage network, and wherein there is additionally, that is to say optionally, a battery store 400 which is connected here to the medium-voltage network 110 using an AC/DC converter which is not shown. Furthermore, a medium-voltage switch or a medium-voltage switchgear, which supplies the charging infrastructure in the event of network faults, network disturbances or network failures, may be optionally arranged between the medium-voltage network 110 and the battery store 400. The charging infrastructure is connected to the medium-voltage network 110 via a transformer 300.

The individual charging stations 500, 600 are supplied with energy via a low-voltage network 310, in particular an AC low-voltage network 310, which is connected to the transformer 300. The charging infrastructure can be controlled via a router 700 having an infrastructure controller 200. The infrastructure controller 200 may optionally comprise an energy store controller 100 for the battery store 400, which energy store controller makes it possible to collect energy.

Figure 2:
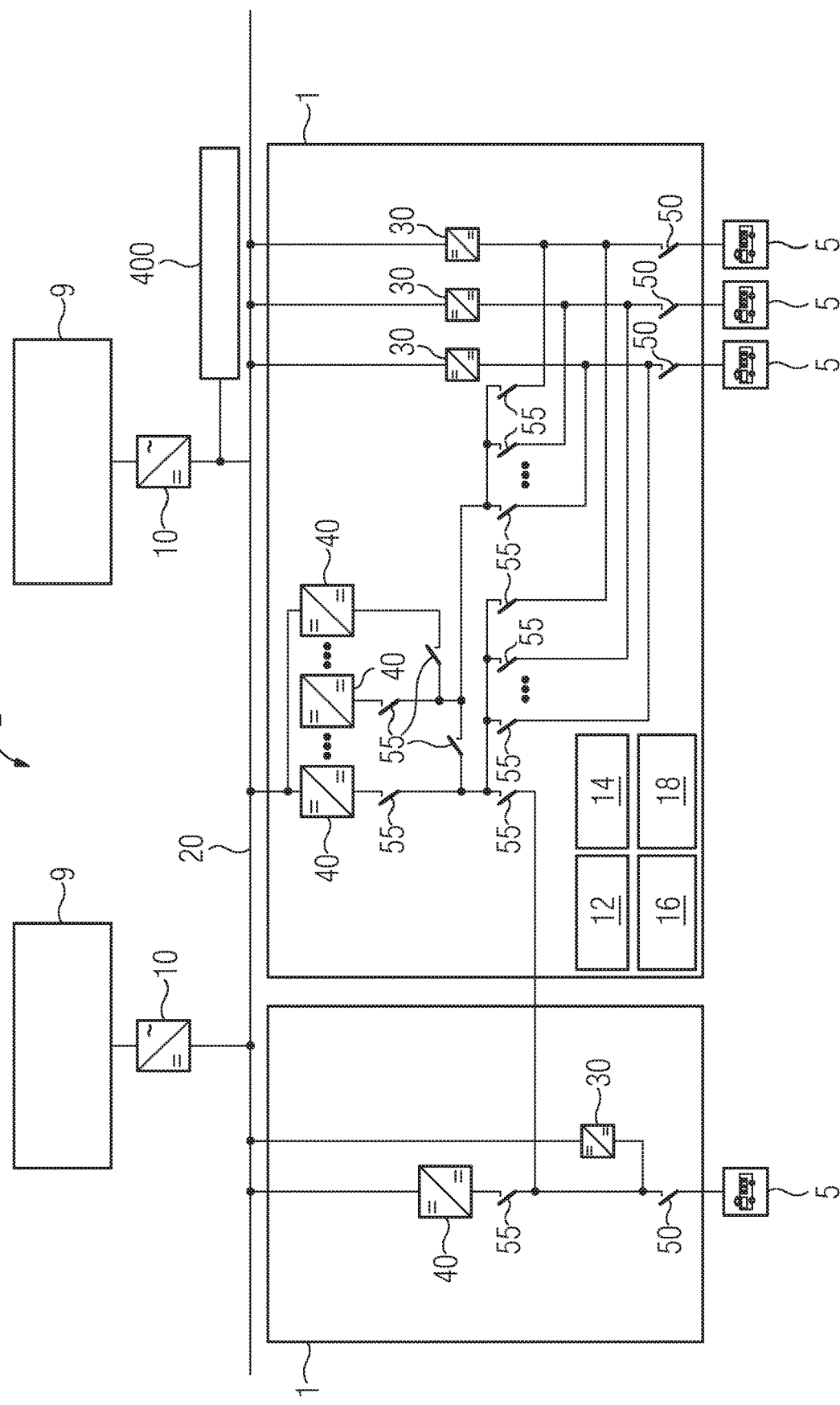
FIG. 2: schematic illustration of a charging infrastructure according to the invention with redundant energy supply.

FIG. 2 shows a schematic illustration of a charging infrastructure 2 according to the invention, wherein the charging infrastructure 2 is supplied with energy via two AC/DC converters 10, wherein one of the two AC/DC converters 10 is optionally connected to a battery store 400 and particularly reliable and efficient energy supply is therefore ensured. In this case, the left-hand AC/DC converter 10 is fed, for example, from a low-voltage network 9 or a medium-voltage network 9, here an AC network, and the right-hand AC/DC converter 10 is fed, for example, from a redundant low-voltage network 9 or a redundant medium-voltage network 9, here an AC network (blocks above the two AC/DC converters 10). Also illustrated are two charging infrastructure units 1 which are arranged on the DC side of the AC/DC converters 10 and are connected to the AC/DC converters 10 via busbars 20 and/or cables 20.

The left-hand charging infrastructure unit 1 has a first type of a DC-isolated "standard" DC chopper controller 30, on which a charging connection for a vehicle 5 is arranged. The first type of DC-isolated DC chopper controller 30 can be electrically connected to the vehicle 5 via a DC circuit breaker 50 and the vehicle 5 can be charged with a first charging power. As long as the charging operation has not been started or is not running, a boost unit 40 consisting of a second type of a DC-isolated DC chopper controller 40 can be electrically connected in parallel with the first type of a DC-isolated DC chopper controller 30 via a switch, in particular a contactor 55, that is to say a further circuit breaker, in particular a further DC circuit breaker. The boost unit 40 additionally provides a second charging power. In addition, the boost units 40 of the right-hand charging infrastructure unit 1 can be connected via a further contactor 55, with the result that the charging power of the left-hand charging infrastructure unit 1 can be increased further. This cross-connection or "meshed busbar" connection achieves not only an increased supply reliability, but also the charging power can be optimally distributed to different charging infrastructure units 1 and their charging connections.

The right-hand charging infrastructure unit 1 also has three DC-isolated DC chopper controllers 30 of the first type, on each of which a charging connection for a vehicle 5 is arranged. The DC-isolated DC chopper controllers 30 of the first type can be electrically connected to a respective vehicle 5 via a respective DC circuit breaker 50, and the respective vehicle 5 can be charged with a first charging power. The boost units 40, DC-isolated DC chopper controllers of the second type, can be electrically connected in parallel with any desired charging connections of the right-hand and left-hand charging infrastructure unit 1 via the contactors 55 shown and the charging power can therefore be increased or adapted.

This cross-connection or "meshed busbar" connection produces not only increased supply reliability, but the charging power can also be optimally distributed to different charging infrastructure units 1 and their charging connections for vehicles 5. For example, two adjacent charging infrastructure units can be respectively connected. Alternatively, one or more charging infrastructure units 1 which are spaced apart can also be respectively connected in a crosswise manner. The right-hand infrastructure unit 1 also has a communication controller 12, a control or computing unit 14, a human machine interface "HMI" 16 and a communication unit 18, wherein these units are used for control and communication. Alternatively and not shown here, a communication controller 12, a control or computing unit 14, a human machine interface "HMI" 16 and a communication unit 18 can also be present in each of the charging infrastructure units 1 or only in individual charging infrastructure units 1 and/or centrally.

Figure 3:
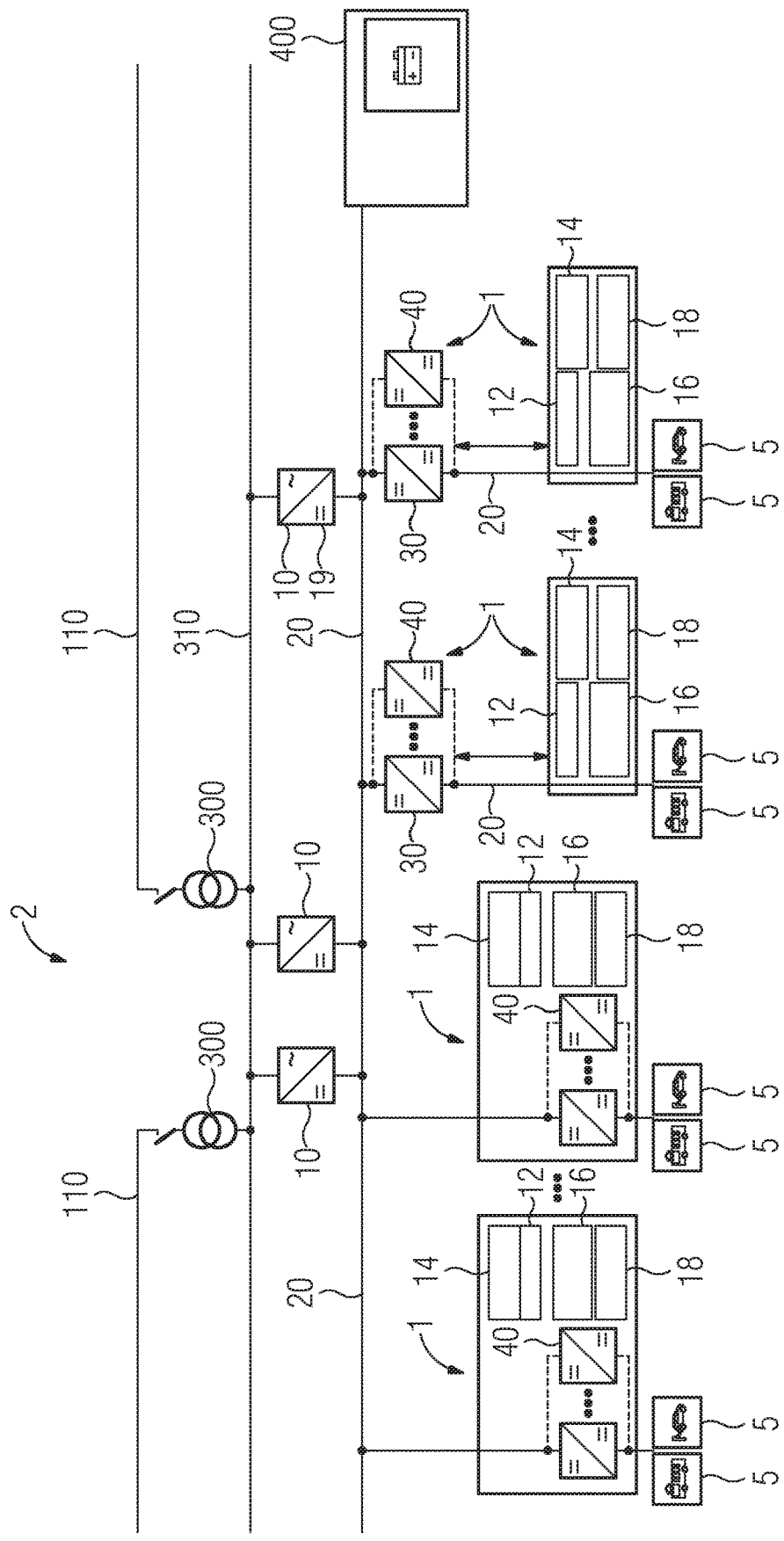
FIG. 3: schematic illustration of a modular charging infrastructure according to the invention with redundant energy supply.

FIG. 3 shows a schematic illustration of a modular charging infrastructure 2 according to the invention with redundant energy supply. The charging infrastructure 2 is connected, via AC/DC converters 10, to a low-voltage network 310 which in turn can be connected to a medium-voltage network 110 via switchgear and transformers 300. In this case, one or more of the AC/DC converters 10 can be equipped with a central control and communication unit 19. Alternatively, not shown here, the central control and communication unit 19 can also be arranged separately, for example in a central control unit.

The left-hand branch of the charging infrastructure 2 has a plurality of charging infrastructure units 1, wherein some of the boost units 40 indicated with the dashed lines are connected or can be connected in a crosswise manner according to FIG. 2, that is to say are connected or can be connected electrically via contactors 55, not shown here. The right-hand branch of the charging infrastructure 2 shows a plurality of charging infrastructure units 1 in which the charging connection with a control unit 14 and a communication unit 18 is spatially separated from the DC-isolated DC chopper controllers 30 of the first type and the boost units 40. In addition, the right-hand branch also has a battery store 400 connected via a DC bus, preferably busbars 20. From the AC/DC converter 10 to the charging connections, the current connections are formed by busbars and/or cables 20.

Figure 4:
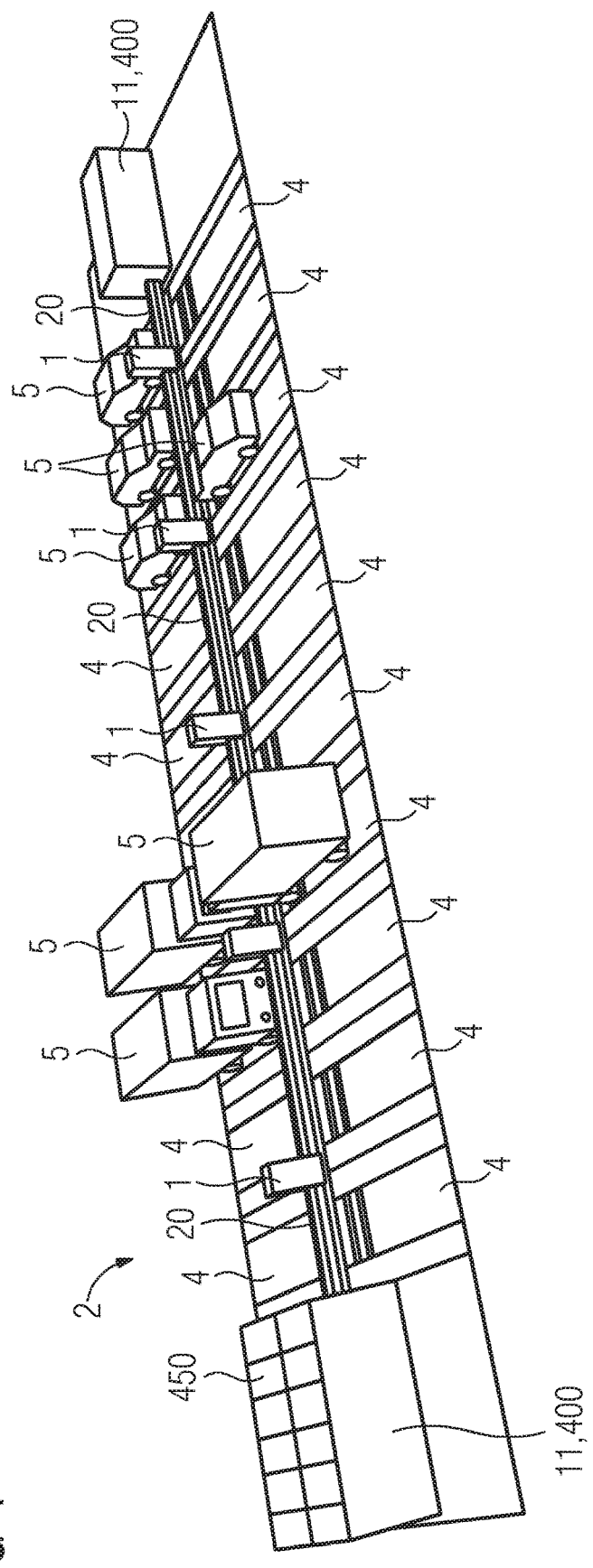
FIG. 4: schematic illustration of a small charging infrastructure according to the invention with redundant energy supply.

FIG. 4 shows a schematic illustration of a small charging infrastructure 1 according to the invention with redundant energy supply. A plurality of charging infrastructure units 1 connected via busbars 20 are arranged along a plurality of parking spaces 4 and have a plurality of charging connections, here four charging connections in each case. Vehicles 5 can be charged via the charging connections, that is to say the energy stores of the vehicles 5 can be charged. An energy store 400 and/or a network connection point 11 is/are arranged at both ends of the busbars 20. The right-hand network connection point is accommodated in a container which can preferably be transported by a truck. The network connection point 11 and/or the battery store 400 on the left-hand side also has/have solar cells 450 on the roof which can also be arranged over the entire parking space. The network connection point(s) 11 has/have, not shown here, an AC/DC converter 10 and optionally one or more transformers 300. This arrangement forms a small charging infrastructure 2.

Figure 5:
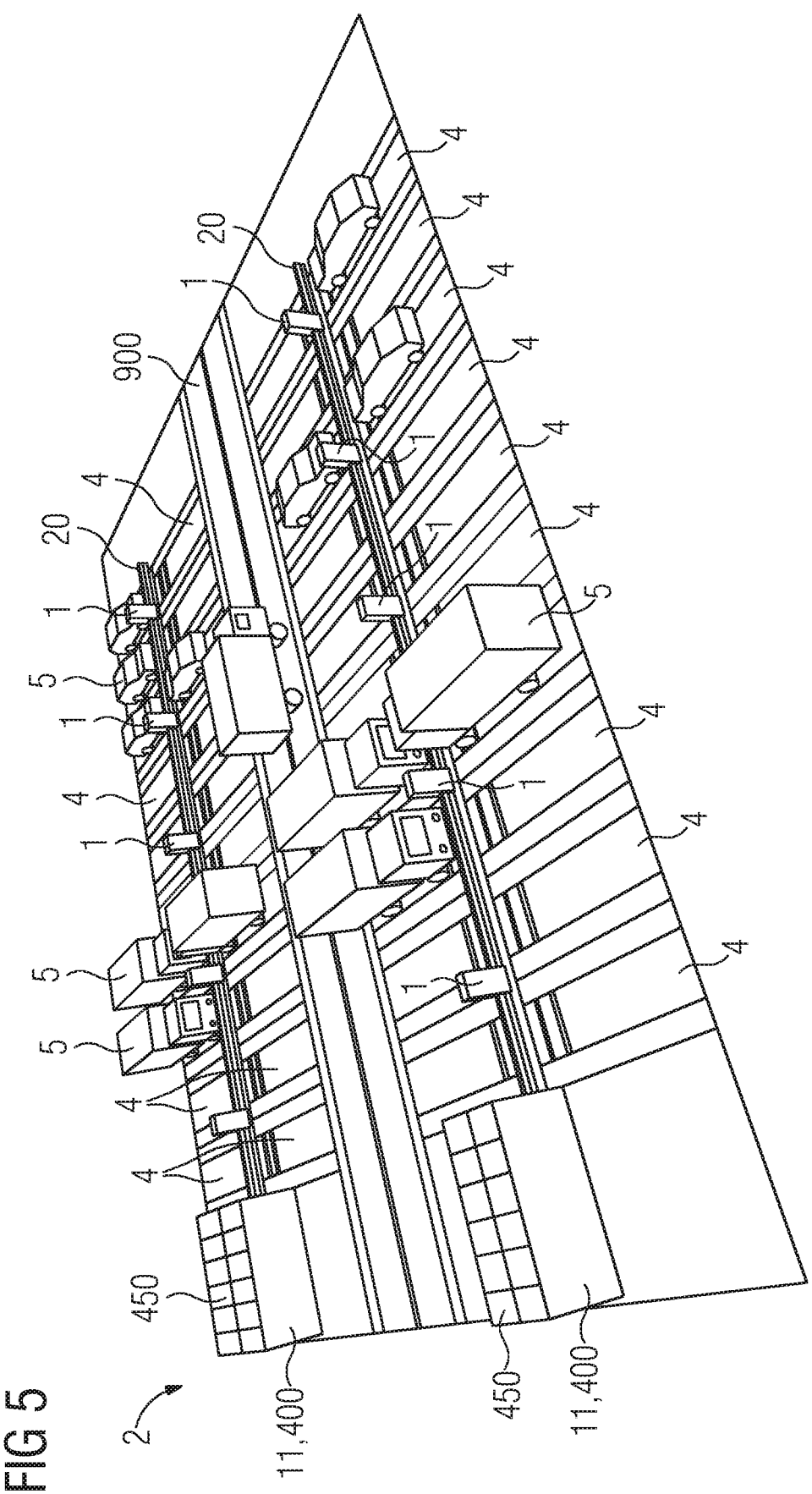
FIG. 5: schematic illustration of a further medium charging infrastructure according to the invention with redundant energy supply.

FIG. 5 shows a schematic illustration of a medium charging infrastructure 2 according to the invention with redundant energy supply. In FIG. 5, two busbar arrangements 20 with parking spaces 4 are arranged parallel to one another and are connected to one another in a crosswise manner, preferably underground, that is to say under a road 900, compare FIG. 2. Both network connection points 11, at the top left and the bottom left, have solar cells 450 for generating regenerative energy. The upper network connection point 11 additionally has an optional battery store 400. Otherwise, the structure is similar to that in FIG. 4 with charging infrastructure units 1 along the busbars 20 for vehicles 5 in parking spaces 4.

Figure 6:
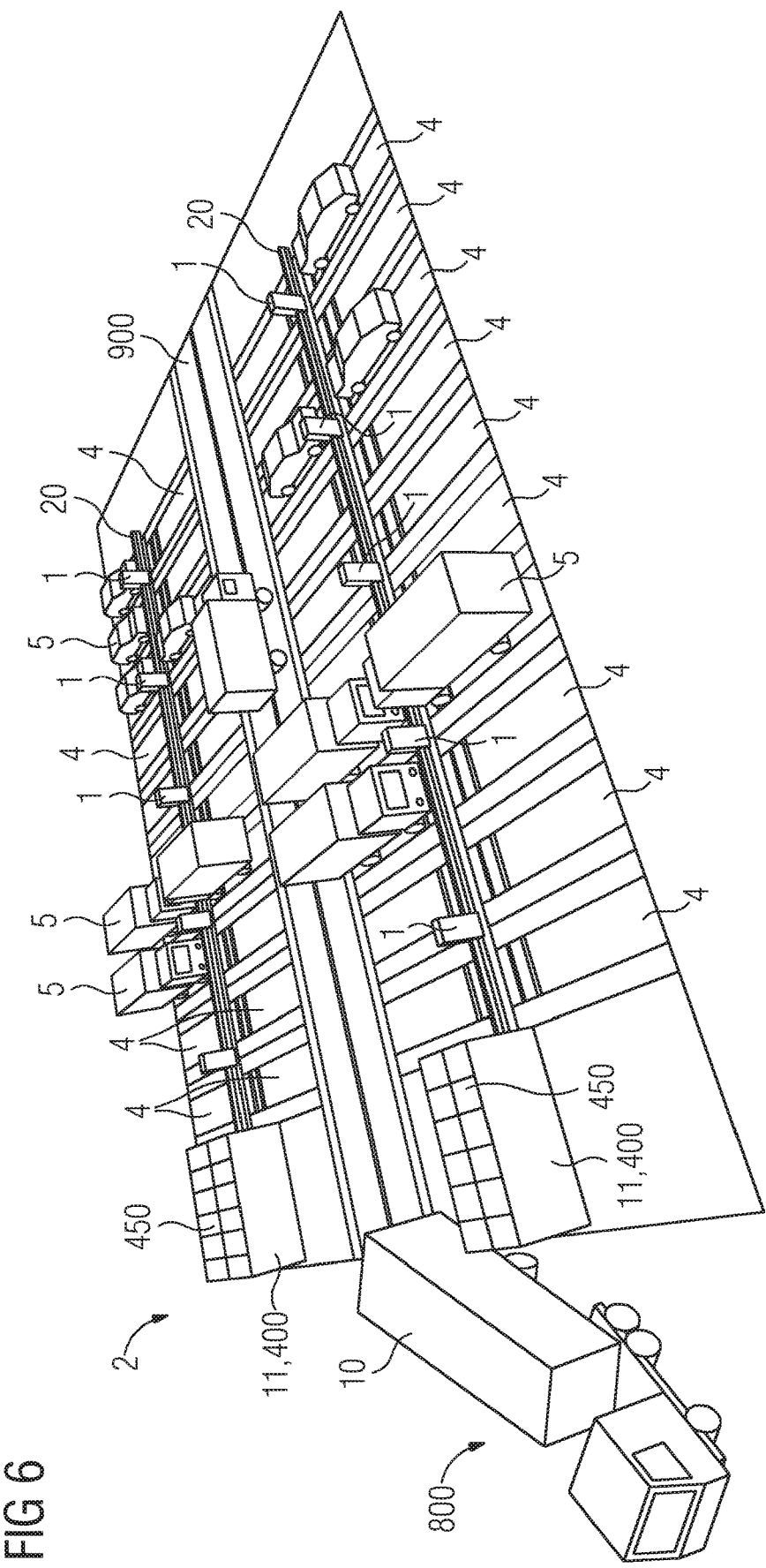
FIG. 6: schematic illustration of a further large charging infrastructure according to the invention with redundant energy supply.

FIG. 6 shows a schematic illustration of a large charging infrastructure 2 according to the invention with redundant energy supply. Two busbar arrangements 20 with parking spaces 4 are again arranged parallel to one another and are connected to one another in a crosswise manner, preferably underground, that is to say under a road 900. Both network connection points 11, at the top left and the bottom left, have solar cells 450 for generating regenerative energy. The upper network connection point 11 additionally has an optional battery store 400. The difference from FIG. 5 lies in the number of charging infrastructure units 1. Furthermore, the modular expansion is shown by the delivery of a further AC/DC converter 10 in a truck container 800.

Figure 7:
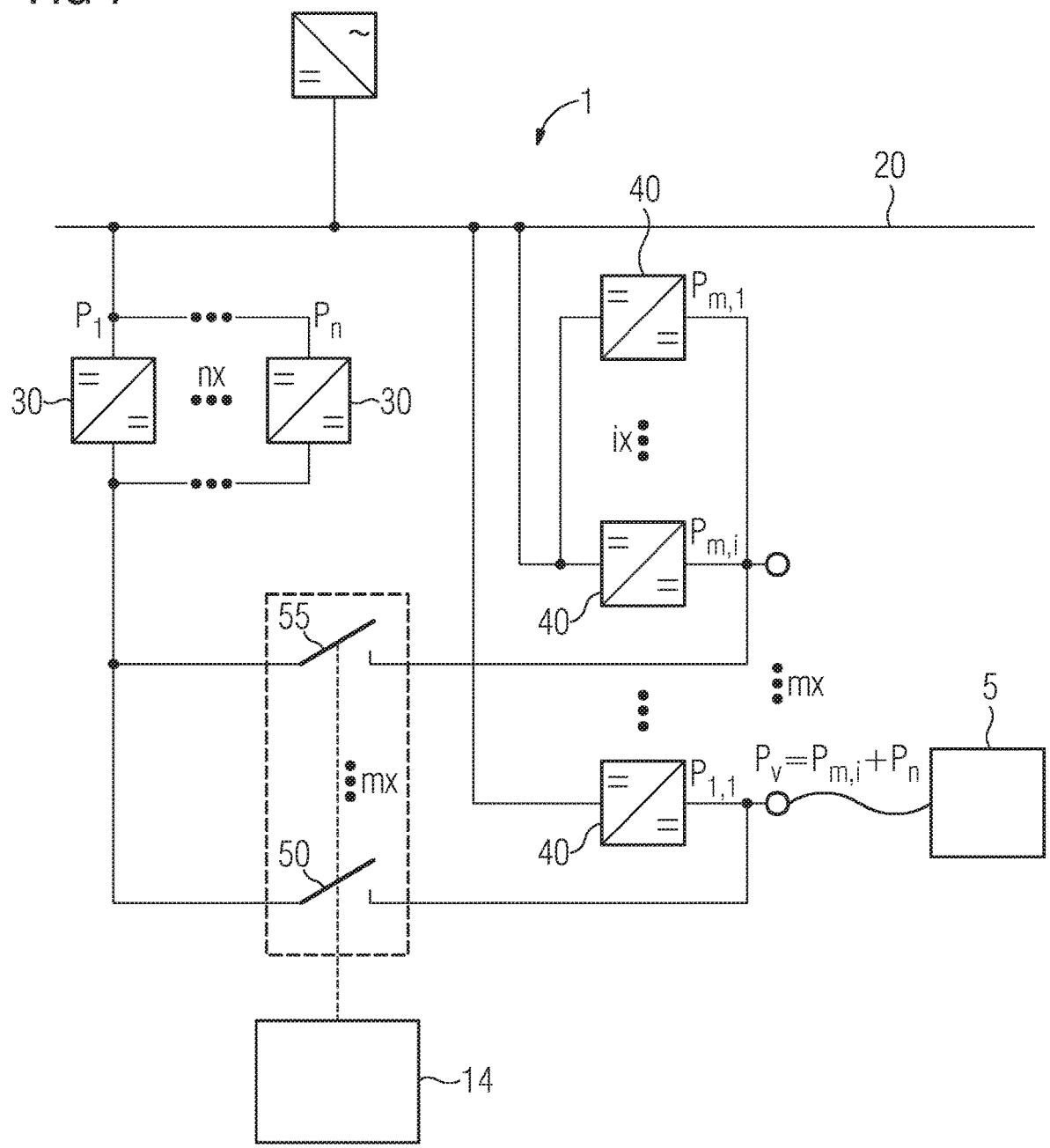
FIG. 7: schematic illustration of a charging infrastructure unit according to the invention.

FIG. 7 is a schematic illustration of a charging infrastructure unit 1 according to the invention. The connection of n booster units 40 to m DC-isolated DC chopper controllers 30 of the first type for vehicles 5 at the respective charging connections via switches 50 and switches 55, which can be controlled here via a control or computing unit 14, is shown. The charging infrastructure unit 1 is here again supplied with DC voltage by an AC/DC converter 10, which DC voltage is provided via cables 20 or busbars 20.

Figure 8:
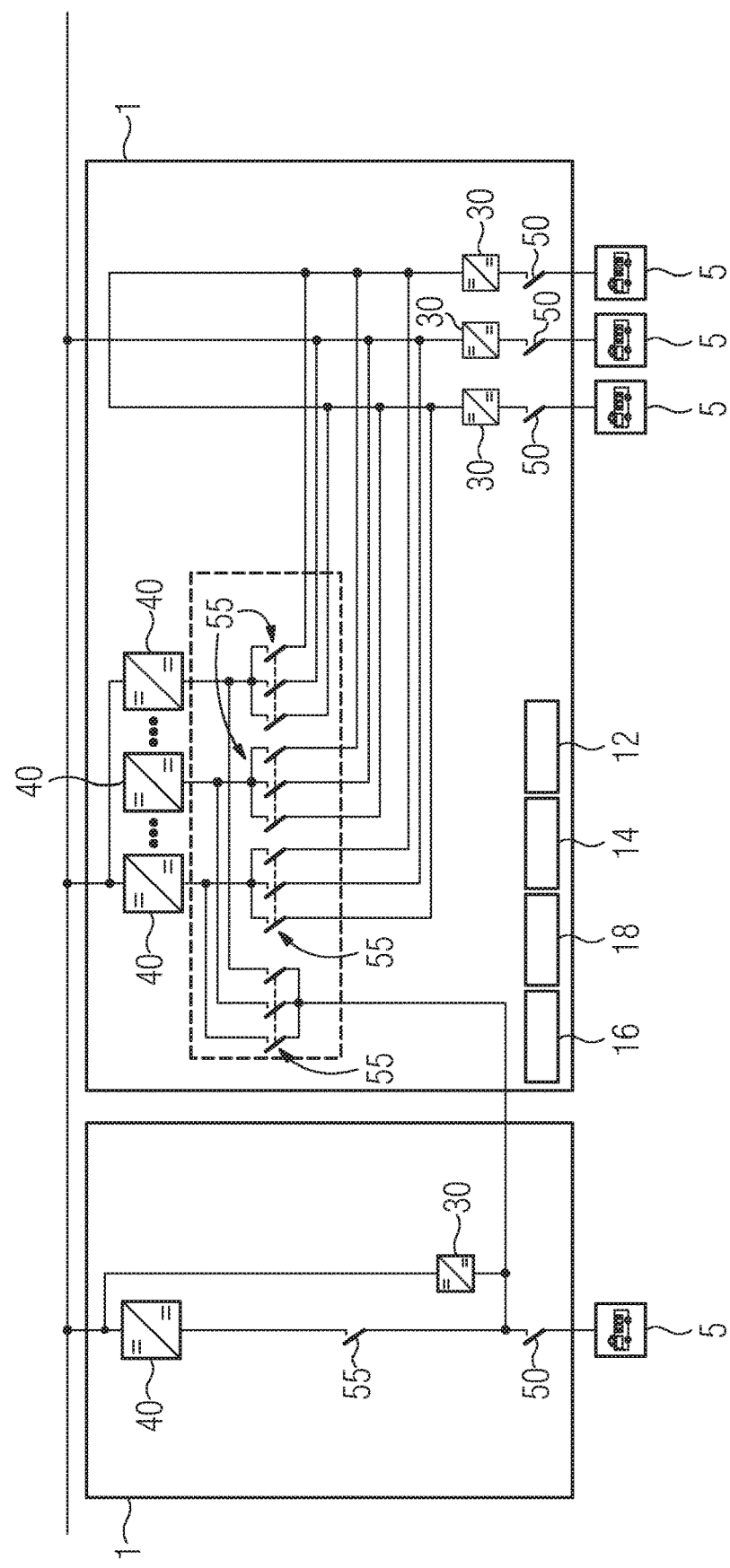
FIG. 8: schematic illustration of a charging infrastructure according to the invention.

FIG. 8 is another illustration of the two charging infrastructure units 1 from FIG. 2 with a crosswise connection of the boosters 40 in order to achieve the greatest possible flexibility. The booster units 40 of the right-hand charging infrastructure unit 1 can be flexibly connected in parallel with the DC-isolated DC chopper controllers 30 of the first type of the right-hand and left-hand infrastructure unit via a multiplicity of contactors 55, thus providing maximum flexibility with respect to the charging power for the respective charging connections for the vehicles 5. The DC-isolated DC chopper controllers 30 can be connected via circuit breakers 50, that is to say the DC-isolated DC chopper controllers 30 and any booster units 40 connected in parallel therewith can be switched under load via the circuit breakers 50, that is to say the respective charging connection can be connected and disconnected via the circuit breakers 50. The right-hand charging infrastructure unit 1 also has a communication controller 12, a control or computing unit 14, a human machine interface "HMI" 16 and a communication unit 18, wherein these units are used for control and communication.

LIST OF REFERENCE SIGNS

1 Charging infrastructure units;
2 Charging infrastructure;
4 Parking space;
5 Vehicle;
9 Low-voltage network or medium-voltage network;
10 AC/DC converter;
11 Network connection point;
12 Communication controller;
14 Control or computing unit;
16 Human machine interface "HMI";
18 Communication unit;
19 Central control and communication unit;
20 Busbars and/or cables;
30 First type of a "standard" DC-isolated DC chopper controller;
40 Second type of a "booster" DC-isolated DC chopper controller;
50 DC circuit breaker, in particular contactor;
55 DC circuit breaker, in particular contactor;
100 Energy store controller;
110 Medium-voltage network;
200 Infrastructure controller;
310 Low-voltage network, AC low-voltage network;
300 Transformer;
400 Battery store;
450 Solar cells;
500 Charging stations, high-power charger;
600 Charging stations, AC charger for slow charging;
700 Router;
800 Truck container;
900 Road.

The invention claimed is:

1. A charging infrastructure unit for at least partially electrically operated vehicles, the charging infrastructure unit comprising:
   a plurality of DC-isolated DC chopper controllers for charging one or more vehicles, and one or more supply connections for supplying said DC chopper controllers with energy;
   one or more charging connections for connecting the one or more vehicles to the charging infrastructure unit;
   each of said charging connections being connected to a first type of said DC-isolated DC chopper controllers, which is electrically connected to one or more supply connections, and wherein said first type of said DC-isolated DC chopper controller is configured to provide a first charging power at a respective said charging connection;
   one or more second types of said DC-isolated DC chopper controllers to be connected in parallel with said first type of DC-isolated DC chopper controller via one or more switches to render said second type of DC-isolated DC chopper controller a boost unit for said first type of DC-isolated DC chopper controller and to provide a second charging power with said second type of DC-isolated DC chopper controller in addition to the first charging power provided by said first type of DC-isolated DC chopper controller at a respectively assigned charging connection, and wherein said boost unit is permanently assigned to a respective charging connection and/or said boost unit is variably assigned to the respective charging connection.

2. The charging infrastructure unit according to claim 1, further comprising a communication unit and a control unit.

3. The charging infrastructure unit according to claim 1, further comprising a switch selected from the group consisting of a mechanical circuit breaker and a semiconductor circuit breaker for connecting each said boost unit in parallel with a respective said first type of said DC-isolated DC chopper controller.

4. The charging infrastructure unit according to claim 3, wherein said switch is a contactor or a semiconductor switch which is under-dimensioned with respect to fault currents and said switch is configured to connect said boost unit in parallel with said first type of said DC-isolated DC chopper controller or to disconnect said boost unit without power before or after a charging operation.

5. The charging infrastructure unit according to claim 1, which comprises a plurality of said first type of said DC-isolated DC chopper controllers and said one or more said second type of said DC-isolated DC chopper controllers.

6. The charging infrastructure unit according to claim 1, which comprises one said first type of said DC-isolated DC chopper controller and one or more said second type of said DC-isolated DC chopper controllers forming a boost unit for reducing a charging time or improving a charging efficiency in charging a vehicle battery.

7. A charging infrastructure, comprising:
   two or more charging infrastructure units each according to claim 2 connected electrically in series.

8. The charging infrastructure according to claim 7, further comprising:
   one or more central control units and one or more central communication units;
   said central communication unit being configured to receive or retrieve usage data from said charging infrastructure units connected in the charging infrastructure and to transmit control signals to said charging infrastructure units connected in the charging infrastructure;

said central control unit being configured to capture current profiles and voltage profiles into the charging infrastructure and inside the charging infrastructure and to evaluate the usage data and the captured current profiles and voltage profiles and to generate control signals for said charging infrastructure units on a basis of an evaluation and to transmit the control signals via said communication unit.

9. The charging infrastructure according to claim 7, further comprising one or more AC/DC converters connecting the charging infrastructure to at least one electrical energy supply network selected from the group consisting of a low-voltage network, a medium-voltage network, and a high-voltage network.

10. The charging infrastructure according to claim 9, further comprising one or more battery stores configured to temporarily or permanently supply said charging infrastructure units with energy.

11. The charging infrastructure according to claim 10, wherein said one or more battery stores are at least partially constructed with battery storage units comprising used battery storage units.

12. The charging infrastructure according to claim 11, wherein said battery storage units comprise used vehicle batteries.

13. The charging infrastructure according to claim 10, wherein said one or more battery stores are configured to provide network services being peak shaving or frequency stabilization, and wherein the network services are to be provided automatically on a basis of current profiles and voltage profiles into the charging infrastructure or in response to a control command received from the infrastructure or from outside the charging infrastructure via said central communication unit.

14. The charging infrastructure according to claim 10, further comprising one or more regenerative energy generation units configured to feed electrical power into said one or more battery stores or into a network inside the charging infrastructure.

15. The charging infrastructure according to claim 9, configured to provide network services being peak shaving or frequency stabilization from energy stores of respectively connected vehicles, and wherein the network services are to be provided automatically on a basis of current profiles and voltage profiles into the charging infrastructure or in response to a control command received from the infrastructure or from outside the charging infrastructure via said central communication unit.

16. The charging infrastructure according to claim 7, further comprising one or more central booster units to be connected in parallel with said charging infrastructure units and/or with one or more said first type of said DC-isolated DC chopper controllers by way of one or more mechanical circuit breakers or semiconductor circuit breakers.

17. The charging infrastructure according to claim 9, further comprising busbar systems providing electrical connections for an energy distribution inside the charging infrastructure.

18. The charging infrastructure according to claim 9, wherein said busbar systems provide electrical connections between said charging infrastructure units and from battery stores to said charging infrastructure units.

19. The charging infrastructure according to claim 9, wherein said busbar systems are arranged underground or above the vehicles, and/or at least some of said charging infrastructure units are connectable to one another in a crosswise manner via said busbar systems.

20. The charging infrastructure according to claim 9, wherein at least said charging infrastructure units and one or more AC/DC converters are movably mounted on a transport vehicle.

* * * * *